United States Patent
Vinogradov et al.

(10) Patent No.: US 7,063,261 B2
(45) Date of Patent: Jun. 20, 2006

(54) ELECTRO-OPTICAL READER WITH IMPROVED LASER INTENSITY MODULATION OVER EXTENDED WORKING RANGE

(75) Inventors: Igor Vinogradov, Bay Shore, NY (US); Vladimir Gurevich, Stony Brook, NY (US); David Tsi Shi, Stony Brook, NY (US); Dariusz J. Madej, Shoreham, NY (US); Mehul M. Patel, Fort Salonga, NY (US); Edward Barkan, Miller Place, NY (US); Heng (Jade) Zhang, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/897,724

(22) Filed: Jul. 23, 2004

(65) Prior Publication Data
US 2006/0016892 A1    Jan. 26, 2006

(51) Int. Cl.
G06K 7/10 (2006.01)
G06K 7/14 (2006.01)

(52) U.S. Cl. ..................................................... 235/454

(58) Field of Classification Search .......... 235/462.01, 235/462.21, 462.22, 462.32, 462.35, 462.38; 359/214, 795; 250/216; 430/321
See application file for complete search history.

(56) References Cited

U.S. PATENT DOCUMENTS

| | | | | |
|---|---|---|---|---|
| 5,080,456 A | * | 1/1992 | Katz et al. | 359/214 |
| 5,156,943 A | * | 10/1992 | Whitney | 430/321 |
| 5,164,584 A | * | 11/1992 | Wike et al. | 250/216 |
| 5,216,550 A | * | 6/1993 | Rudeen | 359/795 |
| 5,331,143 A | * | 7/1994 | Marom et al. | 235/462.38 |
| 5,438,187 A | * | 8/1995 | Reddersen et al. | 235/462.22 |
| 5,717,194 A | * | 2/1998 | Forbes et al. | 235/462.32 |
| 5,770,847 A | * | 6/1998 | Olmstead | 235/462.35 |
| 6,488,208 B1 | * | 12/2002 | Runge et al. | 235/462.01 |
| 6,651,888 B1 | * | 11/2003 | Gurevich et al. | 235/462.21 |

* cited by examiner

Primary Examiner—Michael G. Lee
Assistant Examiner—Tae W. Kim
(74) Attorney, Agent, or Firm—Kirschstein, et al.

(57) ABSTRACT

The combination of a rooftop optical element and a soft edge aperture stop, as well as the introduction of a negative spherical aberration in a positive focusing lens, improve working distance and depth of focus in both moving beam and imaging readers for electro-optically reading indicia such as bar code symbols, especially for close-in symbols, and moreover tend to reduce undesirable light intensity modulation in the beam profile thereby improving reader performance.

9 Claims, 7 Drawing Sheets

ELECTRO-OPTICAL READER WITH IMPROVED LASER INTENSITY MODULATION OVER EXTENDED WORKING RANGE

BACKGROUND OF THE INVENTION

1. Field of the Invention

The present invention generally relates to electro-optical readers, such as laser scanners and imagers and, more particularly, to improved aperture stops and optical components for improving laser intensity modulation over an extended working range or depth of focus in which indicia, such as bar code symbols, are read.

2. Description of the Related Art

Bar code readers are known in the prior art for reading various symbologies such as Universal Product Code (UPC) bar code symbols appearing on a label, or on the surfaces of an article. The bar code symbol itself is a coded pattern of graphic indicia comprised of a series of bars of various widths spaced apart from one another to bound spaces of various widths, the bars and spaces having different light reflecting characteristics. The readers electro-optically transform the graphic indicia into electrical signals, which are decoded into information, typically descriptive of the article or some characteristic thereof. Such information is conventionally represented in digital form and used as an input to a data processing system for applications in point-of-sale processing, inventory control, and the like. Readers of this general type have been disclosed, for example, in U.S. Pat. No. 5,600,121, assigned to the same assignee as the instant application, and may employ a portable laser scanning device held by a user, which is configured to allow the user to aim the device and, more particularly, a scanning laser light beam, at a targeted symbol to be read.

The light source in a laser scanning bar code reader is typically a semiconductor laser device. The use of semiconductor devices as the light source is especially desirable because of their small size, low cost and low voltage requirements. The laser beam is optically modified, typically by an optical assembly, to form a beam spot or cross-section of a certain size at a target distance. It is preferred that the cross-section of the beam spot at the target distance be approximately the same as a minimum width between regions of different light reflectivity, i.e., the bars and spaces of the symbol.

In moving laser beam readers known in the art, the laser light beam is directed by a lens or other optical components along a light path toward a target that includes the bar code symbol. The moving-beam reader operates by repetitively scanning the light beam in a scan pattern across the symbol by means of motion of a scanning component, such as a moving mirror placed in the path of the light beam. The scanning component may either sweep the beam spot across the symbol and trace a scan line, or a series of scan lines, or another pattern, across the symbol, or scan a field of view of the reader, or both.

Bar code readers also include a sensor or photodetector which detects light reflected or scattered from the symbol. The photodetector or sensor is positioned in the reader in an optical path so that it has a field of view which ensures the capture of a portion of the light which is reflected or scattered off the symbol. The light is detected and converted into an electrical signal.

Some bar code readers are "retro-reflective". In a retro-reflective reader, a moving optical element such as a mirror is used to transmit the outgoing beam and receive the reflected light. Non-retro-reflective readers typically employ a moving mirror to transmit the outgoing beam, but have a separate detection system with a wide, static field of view.

Electronic circuitry and software decode the electrical signal into a digital representation of the data represented by the symbol that has been scanned. For example, the analog electrical signal generated by the photodetector is converted by a digitizer into a pulse width modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented. Such signal processors are disclosed in U.S. Pat. No. 5,734,153, assigned to the same assignee as the instant application.

Different symbols have different information densities and contain a different number of elements in a given area representing different amounts of encoded data. The denser the code, the smaller the elements and spacings. Printing of the denser symbols on an appropriate medium is exacting and, thus, is more expensive than printing low density symbols with larger elements. The density of a bar code symbol can be expressed in terms of the minimum bar/space width, also called "module size", or as a "spatial frequency" of the code, which is in the inverse of twice the bar/space width.

A bar code reader typically will have a specified resolution, often expressed by the module size that is detectable by its effective sensing spot. For example, the beam spot size may be somewhat larger than the minimum width between regions of different light reflectivities, i.e., the bars and spaces of the symbol. The resolution of the reader is established by parameters of the beam source or the detector, by lenses or apertures associated with either the beam source or the detector, by an angle of beam inclination with respect to a plane of the symbol, by a threshold level of the digitizer, by the programming in the decoder, or by a combination of two or more of these factors. The photodetector will effectively average the light scattered from the area of the projected spot which reaches the detector aperture.

The region within which the reader is able to decode a symbol is called the effective working range of the reader. Within this range, the spot size is such as to produce accurate readings of symbols for a given density. The working range is dependent on the focal characteristics of optical components of the reader and on the module size of the symbol.

Many known readers collimate or focus the laser beam using an optical system to create the beam spot of a given size at a prescribed distance. The intensity of the laser beam at this distance, in a plane normal to the beam (ideally approximately parallel to the scanned symbol), is ordinarily characterized by a "Gaussian" distribution with a high central peak. Gaussian beams typically have a profile along their axis of propagation exhibiting a waist (collimated) zone with limited divergence followed by a divergence zone thereafter. The collimated zone determines a depth of field (focusing range) for maximum bar code density. However, as the distance between the reader and the symbol moves out of the working range of the reader, which is typically only a few inches in length, the Gaussian distribution of the beam spot greatly widens, preventing accurate reading of a symbol. Such readers, accordingly, must be positioned within a relatively narrow range of distances from a symbol in order to properly read the symbol.

It has been proposed to modify a laser scanning beam by directing a collimated beam of laser light into an axicon optical element, for example, a conical lens, to produce a beam of light which exhibits a consistent spot size over a substantial distance along an optical axis of the beam. Such an optical system is disclosed in U.S. Pat. No. 5,164,584, U.S. Pat. No. 5,331,143, and U.S. Pat. No. 6,651,888. The conical axicon produces a nearly diffraction-free beam and increases the working range of the scanning beam. Such a beam exhibits substantially no divergence over a relatively long distance range and then breaks into a donut-like spot pattern of intensity distribution. Such a non-diverging beam can provide two to three times the range of a conventional Gaussian beam for a particular symbol density. However, where such a beam is designed to improve performance in scanning a certain bar code density, the corresponding working range of lower density symbols is not increased significantly or at all, being limited by the distance where the beam breaks into a donut-like distribution.

The conical axicon, by itself, produces a generally circular beam spot, which is not desirable for reading one-dimensional UPC symbols where an oval beam spot is preferred because it is less susceptible to errors introduced by voids and ink spreads in the symbol and by speckle noise. Indeed, the narrow dimension of the oval spot is swept along the scan direction to minimize such errors.

Ellipticity of the beam spot can be introduced in an axicon-based reader by employing a diffraction grating. However, there are limitations in the amount of ellipticity that can be introduced, especially as compared to a non-axicon-based optical system in which a conventional Gaussian beam from a laser diode is directed through an aperture.

Also, the conical axicon is sensitive to pointing error of the laser. In other words, fine angular adjustment and alignment between the laser and the axicon are critical for proper operation. Hence, although it is desirable to use a conical axicon to increase the working range, especially in long-range scanners where far-out symbols are located remotely from the reader, the limitations on making the beam spot have an elliptical shape and on rendering the laser source less sensitive to pointing errors tend to prevent the ready adoption of axicons in electro-optical readers.

SUMMARY OF THE INVENTION

Objects of the Invention

Accordingly, it is a general object of this invention to increase working range in an electro-optical reader.

More particularly, it is an object of the present invention to increase the working range in a moving beam reader, especially for close-in symbols located near the reader.

Still another object of the present invention is to introduce ellipticity of a beam spot without resorting to diffraction gratings.

It is yet another object of the present invention to render a reader less sensitive to pointing errors of the light source and to misalignment.

A still further object of the present invention is to increase the depth of focus in an imaging reader.

Features of the Invention

In keeping with the above objects and others which will become apparent hereinafter, one feature of the present invention resides, briefly stated, in utilizing an optical element which is not symmetric, as in the case of the known conical axicons, but is asymmetric and has length and width dimensions independent of each other, and preferably different in size. This asymmetric optical element, also known herein as a "rooftop" element, has a pair of lens surfaces, preferably planar, meeting along a line that intersects along an optical axis along which the light is propagated. These two lens surfaces focus light to multiple focal points along the optical axis, thereby extending the working range of an electro-optical reader of the moving-beam type in which the rooftop element is used in order to read indicia located within the extended working range. In the case of an imaging reader, the two lens surfaces image light returning from multiple image points along the optical axis.

Thus, the desirable extended working range is obtained. However, the rooftop element creates undesirable light intensity modulation, also known as "wiggles", in a line spread function or beam profile that depicts the light intensity distribution of the light passing through the rooftop element. These wiggles compromise the ability of the reader to successfully read a symbol and, in some cases, may even result in a total failure to read the symbol.

Another feature of this invention resides in a novel aperture stop for reducing the effect of the wiggles, thereby improving the reading performance of the reader. The aperture stop includes an optical aperture, and a support bounding the optical aperture along a border that shapes the optical aperture with variable dimensions along mutually orthogonal directions along which the indicia extends. The dimensions of the optical aperture are different so that the cross-section of light passing therethrough has an oval or elliptical shape, thereby avoiding the prior art requirement for diffraction gratings.

The optical aperture, in accordance with the prior art, may be circular, elliptical, rectangular, square, or diamond in shape. However, in accordance with this invention, the optical aperture has a plurality of light-passing areas spaced apart along the border, and a light-obstructing area is located between a pair of light-passing areas. Preferably, the border is configured to have a periodic shape at opposite sides of the optical aperture as considered along one of the directions. The periodic shape may be sinusoidal or a succession of triangular, trapezoidal, or rectangular forms.

Thus, rather than an abrupt change in light intensity, as would be the case when a beam spot spans a vertical edge at each side of a rectangular aperture, this invention proposes a more gradual change in the light intensity due to the fact that the edge at each side of the aperture is not a vertical linear edge, or a curved edge as in the case of a circular or elliptical aperture. Instead, each edge has a plurality of light-passing areas and light-blocking areas so that the light intensity change is continuous and gradual. Since the opposite sides of the aperture do not cause an abrupt light intensity variation, these opposite sides or edges are sometimes referred to herein as "soft" edges, and the aperture is referred to herein as a "soft edge" aperture.

As noted above, the soft edge aperture reduces the effect of the wiggles in the beam profile, as described in more detail below, but also reduces the working range. However, when the soft edge aperture is used together with the rooftop element which, as explained above, increases the working range, the net effect is, at best, an improvement and, at worst, the working range is unchanged.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 6b, 6c are analogous to FIGS. 5b, 5c, but for the aperture stop of FIG. 6a;

FIGS. 7b, 7c are analogous to FIGS. 5b, 5c, but for the aperture stop of FIG. 7a;

DETAILED DESCRIPTION OF THE PREFERRED EMBODIMENTS

Figure 1:
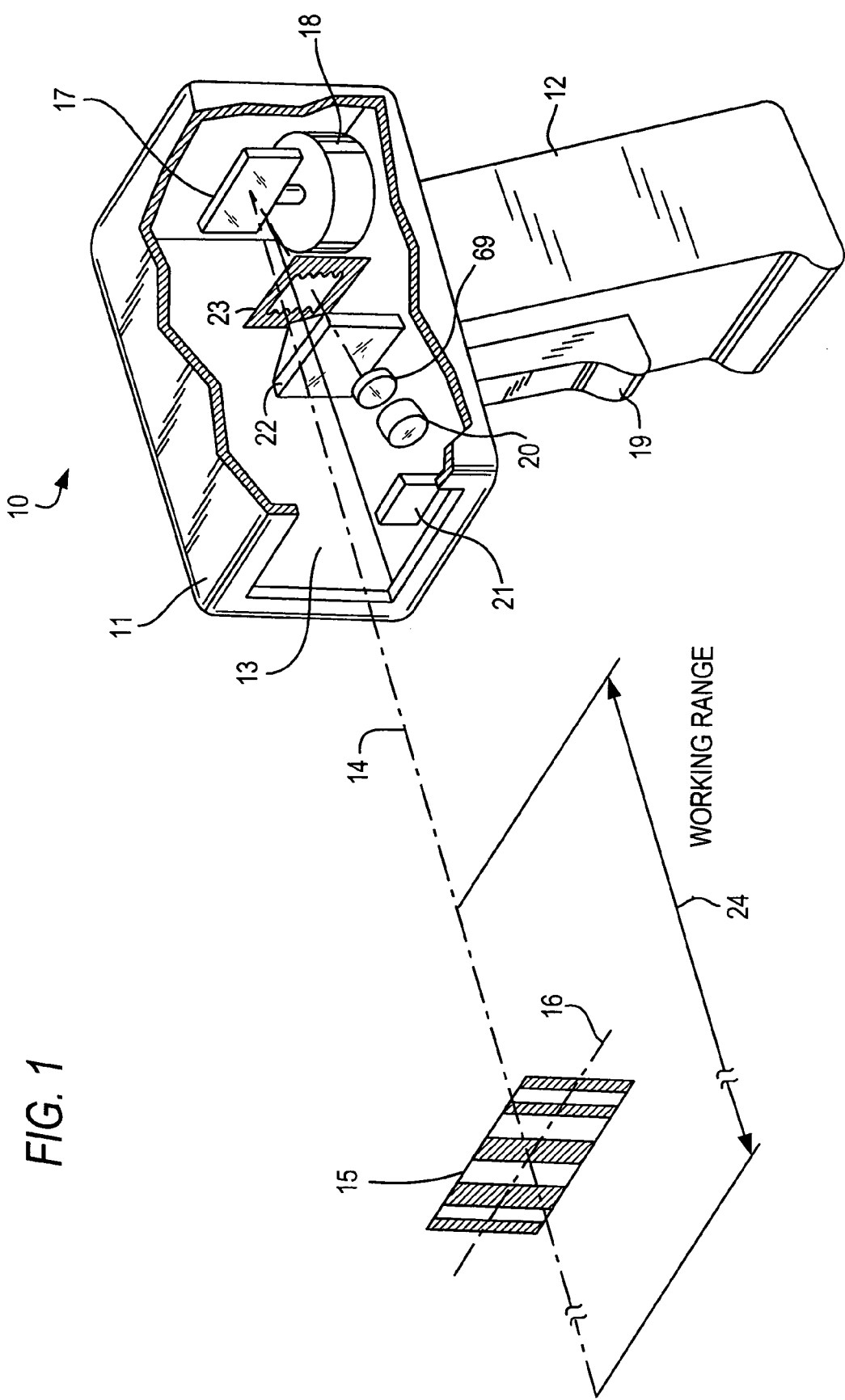
FIG. 1 is a broken-away, perspective view of a handheld device used in a reader for electro-optically reading indicia located in a working range of distances, the device containing one embodiment of a rooftop element, as well as one embodiment of an aperture stop, in accordance with this invention.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia which may be recognized or identified either by scanning a light beam and detecting reflected or scattered light as a representation of variations in light reflectivity at various points of the pattern or indicia, or by scanning a field of view and imaging light returning from the symbol onto a sensor array. FIG. 1 shows an indicia 15 as one example of a "symbol" which the present invention can read.

FIG. 1 depicts a handheld laser scanner device 10 for reading symbols. The laser scanner device 10 includes a housing that is generally of the type shown in the above-mentioned patents having a barrel portion 11 and a handle 12. Although the drawing depicts a handheld pistol-shaped housing, the invention may also be implemented in other types of housings such as a desk-top workstation or a stationary scanner. In the illustrated embodiment, the barrel portion 11 of the housing includes an exit port or window 13 through which an outgoing laser light beam 14 passes to impinge on, and scan across, a bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes a laser source 20, e.g., a gas laser tube or a semiconductor laser diode, mounted within the housing. The laser source 20 generates the laser beam 14. A photodetector 21 is positioned within the housing to receive at least a portion of the light reflected from the bar code symbol 15. The photodetector 21 may face toward the window 13. Alternatively, a convex portion of the scan mirror 17 may focus reflected light on the photodetector 21, in which case the photodetector faces toward the scan mirror. As the beam 14 sweeps the symbol 15, the photodetector 21 detects the light reflected from the symbol 15 and creates an analog electrical signal proportional to the intensity of the reflected light. A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 69, an optical element 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15. Details of the element 22 and the aperture stop 23, to which this invention is directed, are described below.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size which extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24 and substantially normal to the laser beam 14, reflects a portion of the laser light. The photodetector 21, shown mounted in the scanner housing 11 in a non-retroreflective position, detects the reflected light and converts the received light into an analog electrical signal. The photodetector could also be mounted in a retroreflective position facing the scan mirror 17. The system circuitry then converts the analog signal to a pulse width modulated digital signal which a microprocessor-based decoder decodes according to the characteristics of the bar code symbology rules.

Figure 2:
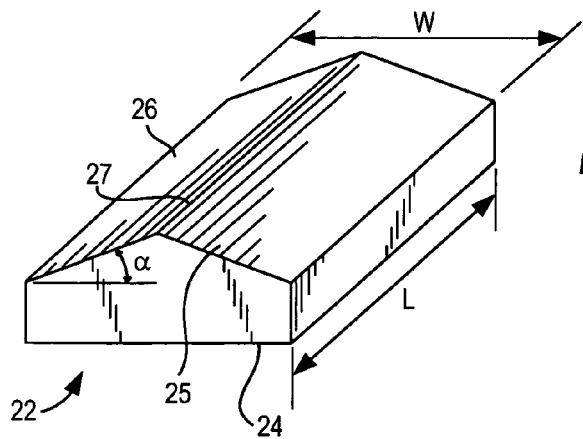
FIG. 2 is an enlarged perspective view of the rooftop element embodiment of FIG. 1.

In accordance with one feature of this invention, one embodiment of the element 22, as best seen in FIG. 2, has a front, generally planar, incident surface 24 for receiving light, and a pair of rear, generally planar, exit surfaces 25, 26 through which light is emitted after passing through the element. The terms "front" and "exit" are used as a convenience, since the surfaces 25, 26 could also be used as front surfaces, and the surface 24 can also be used as an exit surface. The exit surfaces 25, 26 meet along a line 27 that intersects and is perpendicular to the optical axis along which the beam 14 from the source 20 propagates. The element 22 has a length L and a width W, both of these mutually orthogonal dimensions being independently selectable. The optical element 22 bends the light beam 14 coming from the point source 20 on the optical axis so as to cross the axis along the working distance range 24 along a continuous line of points as a function of the angle of inclination a for each exit surface.

As described above, it was known in the art to employ a conical symmetrical axicon, in which the exit surfaces were conical, instead of being planar. The conical axicon produced a circular beam cross-section, which is undesirable for reading one-dimensional symbols. Hence, the art resorted to diffraction gratings and contended with laser pointing errors as described above.

Figure 3:
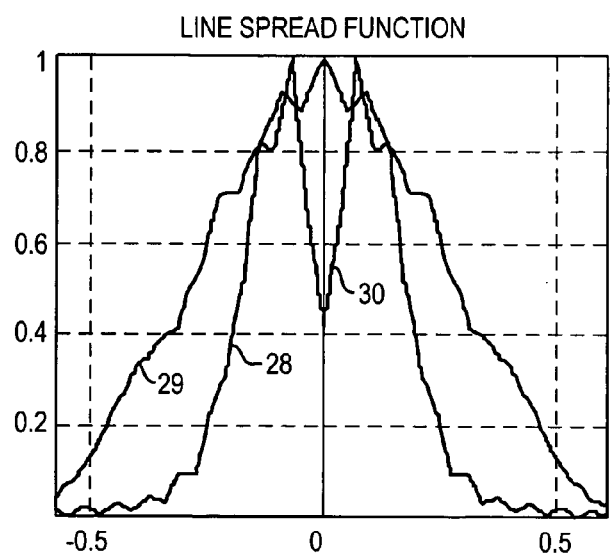
FIG. 3 is a graph of a line spread function over two axes showing an undesirable light intensity modulation.

The asymmetrical or "rooftop" element 22 of this invention produces the desired extended working range, but creates the aforementioned wiggles in the line spread function when used with a conventional aperture stop. For example, FIG. 3 depicts the line spread function for the rooftop element of FIG. 2 when used with a rectangular aperture stop. The line spread function is a function obtained by integrating the light intensity distribution of the beam spot on the symbol in its target plane along the scan direction (x-axis) and along the perpendicular direction (y-axis). In FIG. 3, the x-axis distribution is identified by curve 28, the y-axis distribution is identified by curve 29, and the undesirable light intensity modulation is identified by wiggle 30. The presence of the wiggle leads to decoding degradation or failure.

Figure 4:
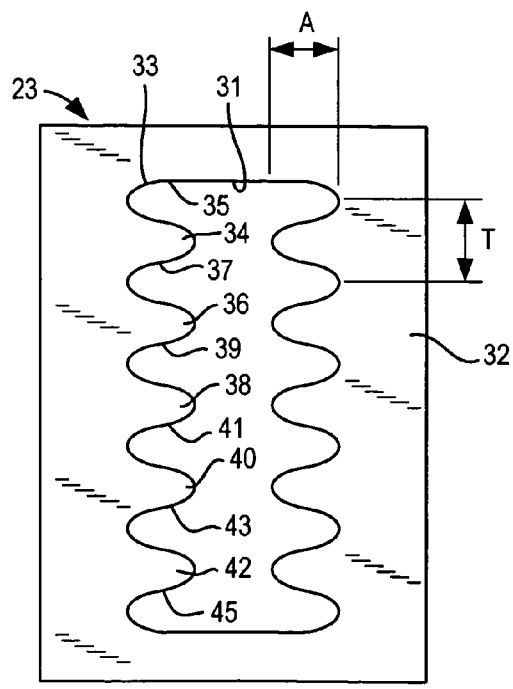
FIG. 4 is an enlarged, elevational view of the aperture stop embodiment of FIG. 1.

In accordance with another feature of this invention, the aperture stop 23 is configured to minimize the wiggle 30. Rather than a square, rectangular, circular, elliptical, or diamond shaped aperture as taught by the prior art, the aperture stop 23 has a "soft" edge as described above. As seen in FIG. 4, the aperture stop 23 has an optical aperture 31, and a support 32 bounding the aperture 31 along a border 33 that shapes the aperture with variable dimensions along the x-axis (horizontal scan direction) and the y-axis (vertical direction). The dimensions along the two axes are different so that the cross-section of the beam passing therethrough has an elliptical shape, with the narrower or shorter dimension being along the scan direction.

The soft edge is characterized by at least two, and preferably a succession of, light-passing areas 35, 37, 39, 41, 43, 45 spaced apart of one another along the border, and by at least one, and preferably a succession of, light-obstructing areas 34, 36, 38, 40, 42, also spaced apart of one another along the border. The light-passing areas alternate with the light-obstructing areas. Preferably, one light-obstructing area is located between a pair of adjacent light-passing areas.

FIG. 4 depicts a preferred embodiment in which the soft edge is a sinusoidal curve having an amplitude A and a period T and characterized in function form as A sin (2πT). Other periodic shapes, such as a succession of triangles, rectangles or trapezoids, could be employed. Other non-periodic shapes, such as a free form curve, could also be used.

Figure 5A:
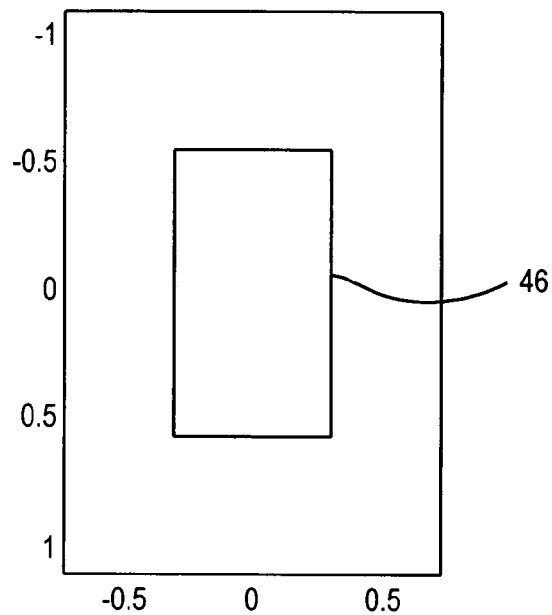
FIG. 5a is a rectangular aperture stop in accordance with the prior art.
Figure 5B:
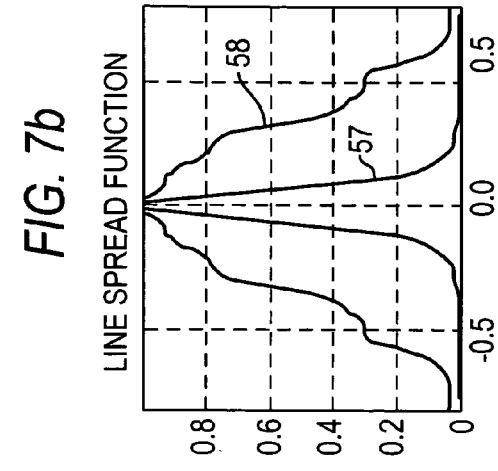
FIGS. 5b, 5c are line spread functions over two axes for close-in and far-out symbols in accordance with the prior art.
Figure 5C:
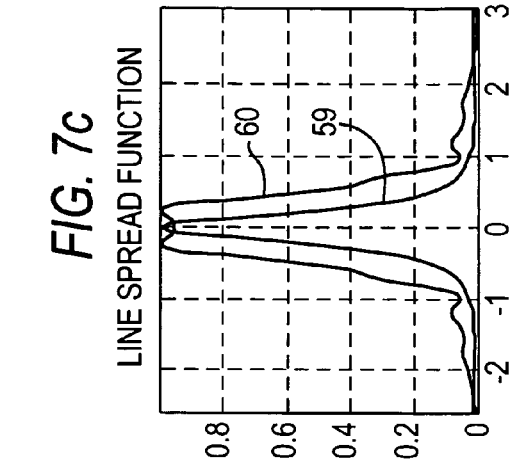

FIG. 5a depicts a standard rectangular aperture 46; FIG. 5b depicts the corresponding line spread functions 47, 48 over the x- and the y-axis at close-in target planes approximately 4 inches from the window 13; and FIG. 5c depicts the corresponding line spread functions 49, 50 over the x- and y-axis at far-out target planes approximately 18 inches from the window. It will be noted that the line spread functions 47, 49 for the x-axis have wiggles or shoulders 51, 52 which detract from the desirable Gaussian beam profile.

Figure 6A:
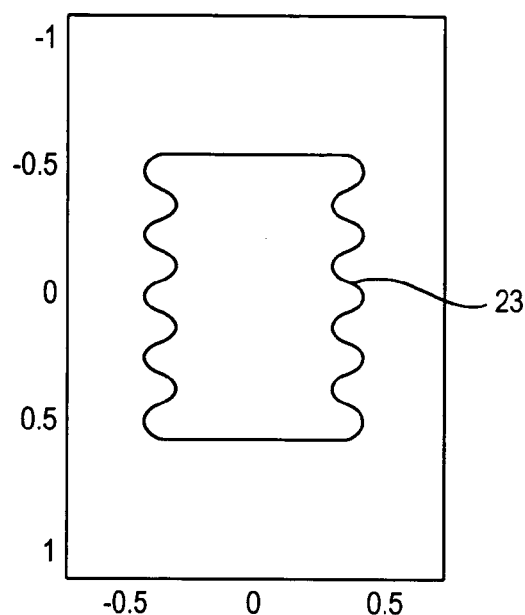
FIG. 6a is a soft edge aperture stop having a first set of design parameters in accordance with this invention.
Figure 6B:
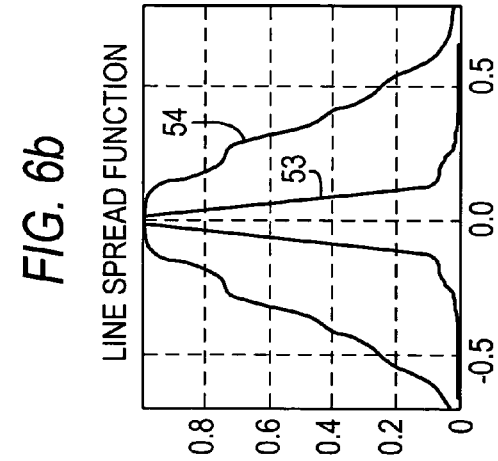

FIG. 6a depicts the soft edge aperture 23 of FIG. 4 wherein A=8% of the aperture width and T=4.5; FIG. 6b depicts the corresponding line spread functions 53, 54 at the close-in target planes; and FIG. 6c depicts the corresponding line spread functions 55, 56 at the far-out target planes.

Figure 7A:
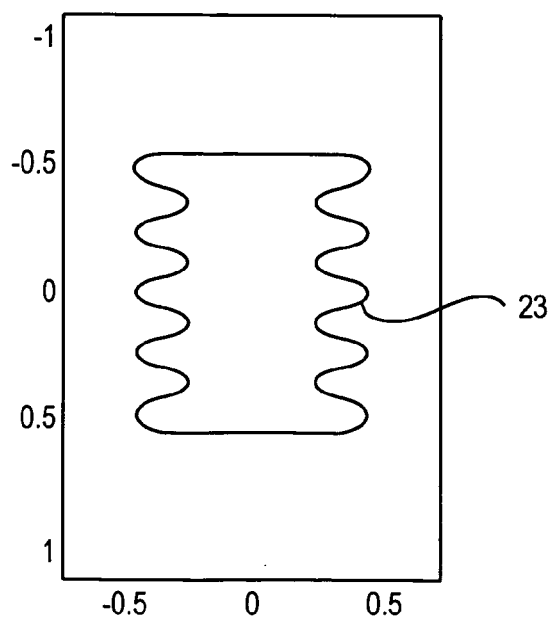
FIG. 7a is a soft edge aperture stop having a second set of design parameters in accordance with this invention.
Figure 6C:
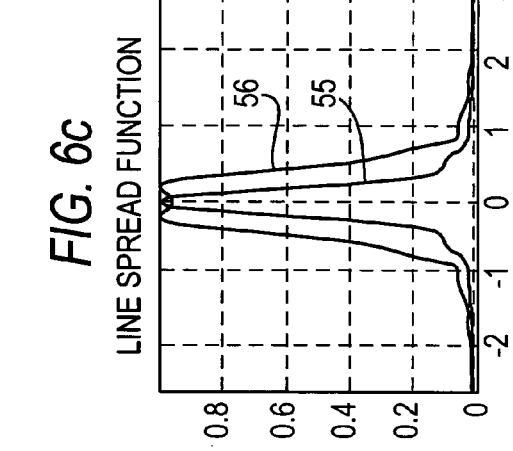
Figure 7B:
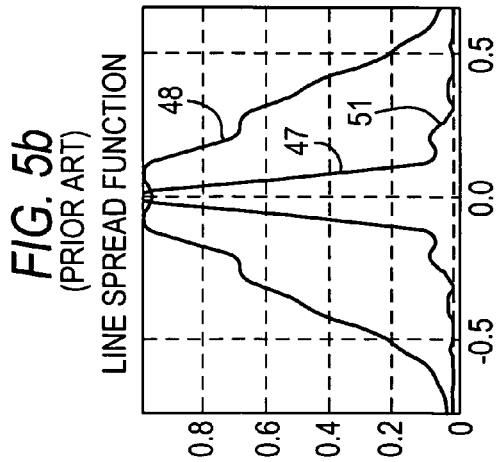
Figure 7C:
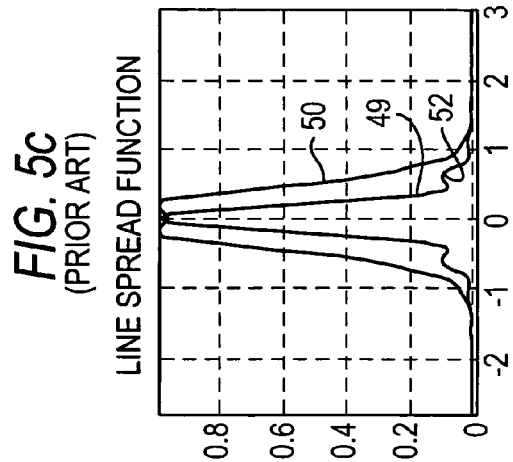

FIGS. 7a, 7b, 7c are analogous to FIGS. 6a, 6b, 6c, except that A=16% of the aperture width. The line spread functions 57, 59 over the x-axis have no shoulders (as compared to shoulders 51, 52) and therefore more closely resemble the ideal Gaussian beam profile.

Figure 8A:
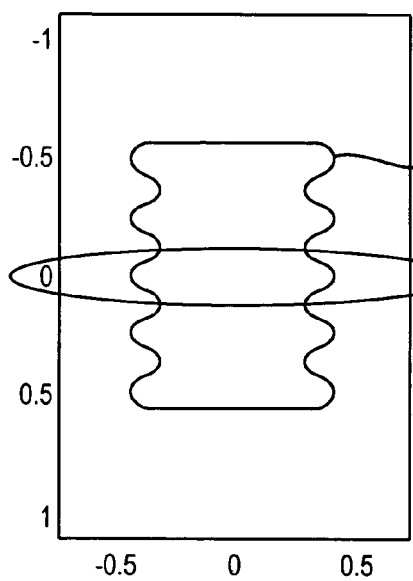
FIGS. 8a, 8b are elevational views of the aperture stop of FIG. 4, but with a superimposed elliptical beam spot depicting insensitivity to laser pointing errors.
Figure 8B:
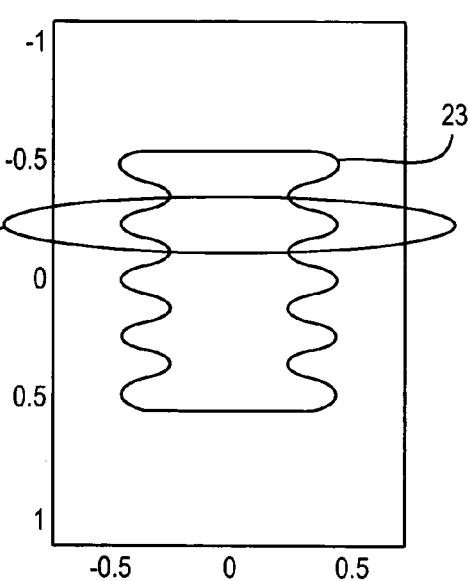

Thus, the greater the amplitude A of the periodic edge, the less effect that the shoulders 51, 52 have in degrading reader performance for both close-in and far-out symbols at opposite ends of the working distance range. The period T is chosen to be smaller than the spot size at the aperture so that a shift of the spot does not adversely affect the line spread function. The beam profile preserves its consistency even with a significant pointing error from the laser source when the maximum intensity of the laser spot is not in the center of the aperture. FIGS. 8a, 8b depict a beam spot shift or pointing error, and the beam profile is not sensitive to this.

The asymmetric rooftop element 22 extends the working range whose effect is counteracted by the soft edge aperture which tends to reduce the working range. However, the reduction of the wiggles in the beam profile improves reader performance, especially for close-in symbols. Also, the aperture stop enables the horizontal and vertical dimensions of the beam spot to be independently optimized. The vertical size of the beam spot can be independently chosen from the horizontal size. Also, as shown in the embodiment of FIG. 9, the front surface 24 need not be planar, but can be configured as a cylindrical surface 61 to control the ellipticity of the beam spot.

Figure 9:
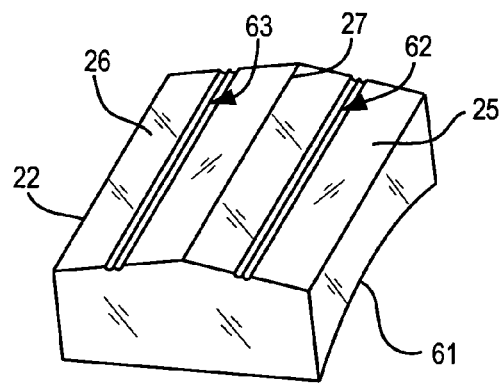
FIG. 9 is a perspective view of another embodiment of a rooftop element in accordance with this invention.
Figure 10:
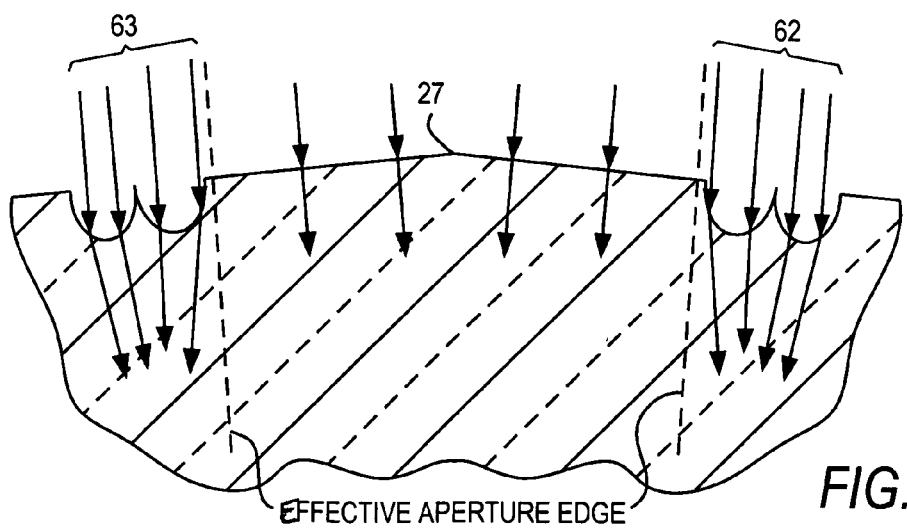
FIG. 10 is an enlarged sectional view of a detail of the surfaces of FIG. 9.

As also shown in FIG. 9, the aperture stop could be formed integrally with the rooftop element 22 by forming a series of grooves 62, 63 on each planar surface 25, 26. As shown in FIG. 10, light passing though the flat areas pass straight through. However, light incident on the grooves 62, 63 is diffused, thereby forming the indicated effective aperture edges. The grooves of each series can be spaced apart with variable distance, thereby imparting a soft aperture edge for incorporation with the rooftop element.

Figure 11:
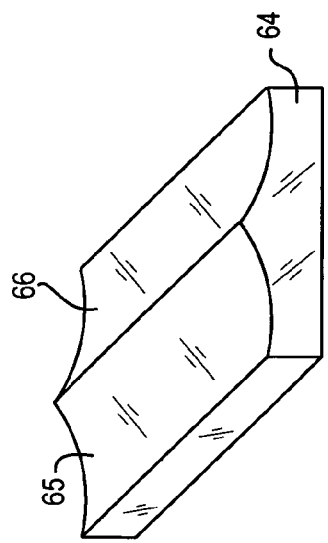
FIG. 11 is a perspective view of another embodiment of a rooftop element in accordance with this invention.

Still another embodiment of the rooftop element 64 is depicted in FIG. 11 and is identical to the one shown in FIG. 2, except that each exit surface is curved, rather than flat.

Preferably, each curved exit surface 65, 66 is a parabola. The beam profile along the y-axis is controlled by the parabolic surfaces.

Figure 12:
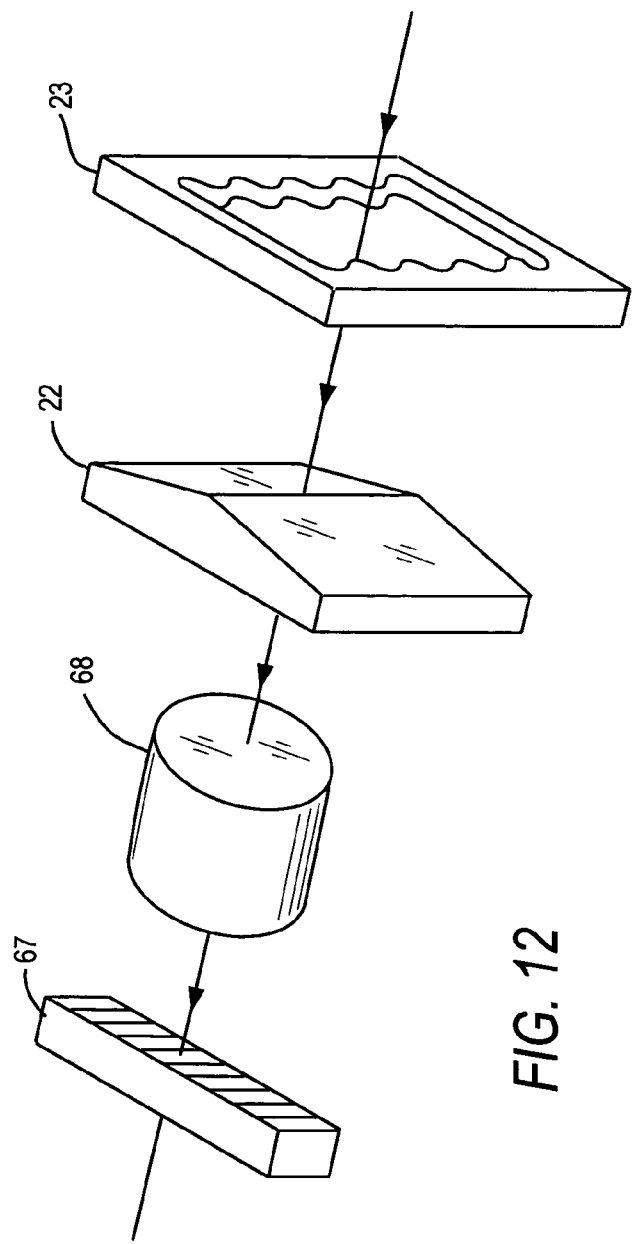
FIG. 12 is a diagrammatic, perspective view of an imaging reader employing the rooftop element and the aperture stop in accordance with this invention.

FIG. 12 schematically depicts components of an imaging reader including a linear sensor array 67 of photocells, preferably charge coupled devices, a focusing lens 68, the rooftop element 22 and the soft edge aperture stop 23, all mounted in a return path of light captured from an image of a symbol located anywhere within a depth of focus. The known imaging readers having a linear array typically have a lower depth of focus than moving beam readers. However, the use of the rooftop element 22 and the soft edge aperture stop 23 in accordance with this invention increases the depth of focus, thereby making this type of imaging reader more available for use in high throughput environments.

Using the rooftop element with the soft edge aperture stop with an imager enables the size of the aperture to be increased at the expense of the extended working range. The new system has the same working range as the one without the axicon-aperture combination but has a larger clear aperture. The larger aperture results in more light being collected by the sensor array which, in turn, enables the sensor's exposure time to be reduced. By reducing the exposure time, the handheld reader's immunity to hand motion is increased. This directly relates into higher throughput and productivity.

It has therefore been proposed to eliminate the use of an axicon in electro-optical readers without sacrificing working range by the use of the rooftop element, preferably combined with the soft edge aperture stop. Still another solution in accordance with this invention is to deliberately form a negative spherical aberration on a surface of a positive (focusing) lens, again for the same purpose of increasing the working range.

Figure 13:
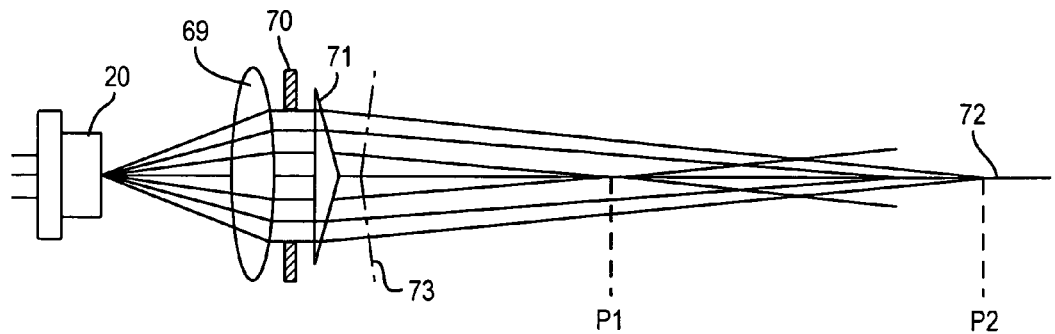
FIG. 13 is a diagrammatic view of an axicon-based optical assembly in accordance with the prior art.

FIG. 13 depicts an axicon-based prior art arrangement in which the laser diode 20 directs a laser beam through the positive focusing lens 69, a conventional aperture stop 70 (i.e., one having a circular, oval, rectangular, square or diamond shaped aperture), and a conical axicon 71 to focus the beam to multiple focal points, e.g., all points between P1 and P2, along the optical axis 72, to define the extended working range. The focusing lens 69 is aberration-free, and the beam wavefront is conical, as schematically represented by reference numeral 73.

Figure 14:
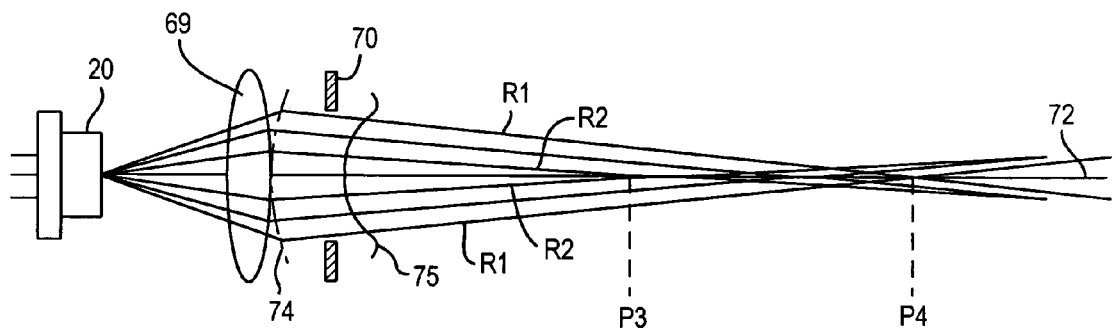
FIG. 14 is a view of a non-axicon-based optical assembly for extending working range in accordance with this invention.

FIG. 14 depicts, according to this invention, an additional optical component 74 is used to generate a negative spherical aberration for the positive focusing lens 69 so that the beam wavefront is aspherical, as schematically represented by reference numeral 75. A negative spherical aberration refracts outer marginal light rays (i.e., the rays R1 which are radially further from the optical axis 72) to a focal point P4 further away from the lens 69, as compared to inner light rays (i.e., the rays R2 which are radially closer to the optical axis 72) to a focal point P3 closer to the lens 69.

Negative spherical aberration, just like positive spherical aberration, is an intrinsic defect which prevents light from being focused at a precise point. It is conventional for an optical designer to compensate for and correct such aberrations. However, in accordance with this invention, the focusing lens is deliberately overcorrected.

Mathematically speaking, the sag (W) of a wavefront at the plane of the exit pupil can be described as:

$$W = AR^2 + BR^4,$$

where A is the coefficient of defocus, B is the coefficient of spherical aberration, and R is the radial distance that a ray is offset from the optical axis. For an aberration-free lens, B is zero. However, in accordance with this invention, B is selected to be a negative value.

The result of overcorrecting the positive lens 69 to have a negative spherical aberration is that the working range as measured between points P3 and P4 is increased. No axicon was used. Thus, the optical assembly is less sensitive to diode pointing errors and laser diode variations, as in the case of axicon-based assemblies. No apodization at the plane of the aperture, such as the use of the aforementioned soft edge aperture stop, is needed, since a conventional aperture stop can be employed. The overcorrected lens, unlike an axicon, allows independent control of the height and width dimensions of the scanning beam along both the x- and y-axes using conventional astigmatic components, such as lenses or mirrors. The beam spot can be made elliptical to a greater extent than can be achieved with axicon-bases assemblies.

Figure 15:
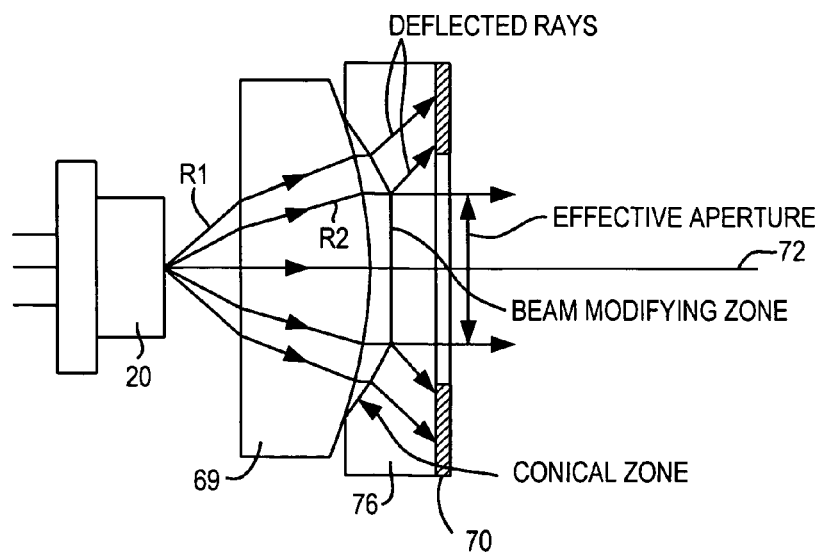
FIG. 15 is a view of another non-axicon-based optical assembly for extending working range in accordance with this invention.

The negative spherical aberration can be introduced by application of plastic aspheric replica on a glass substrate, or directly on the focusing lens 69 to form an integrated one-piece construction. Alternatively, the negative spherical aberration can be introduced by a separate optical component, i.e., a phase plate 76, as shown in FIG. 15. In FIG. 15, a glass plano-covex lens 69 collimates the laser beam. The plastic phase plate 76 has a first surface that combines two zones: a beam modifying zone and a conical zone. The beam modifying zone introduces the desired amount of negative spherical aberration to provide the extended working range according to this invention. The effective aperture is formed by the intersection of the beam modifying zone and the conical zone. The conical zone deflects the rays outside of the effective aperture off the optical axis. The deflected rays are then stopped by the aperture 70. This arrangement minimizes eccentricity of the wavefront of the produced laser beam to provide consistency of the working range.

The phase plate 76 for generating the negative spherical aberration can be also useful for extending the working range in imaging applications. Therefore, the phase plate 76 can replace the rooftop element 22 and the soft edge aperture 23 in FIG. 12.

It will be understood that each of the elements described above, or two or more together, also may find a useful application in other types of constructions differing from the types described above.

While the invention has been illustrated and described as embodied in an electro-optical reader with improved laser intensity modulation over an extended working range, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An optical assembly in a system for electro-optically reading indicia extending along mutually orthogonal directions by sweeping a laser beam in a scan across the indicia, comprising:

a) an asymmetric optical element for extending working range in which the indicia is read with concomitant undesirable laser intensity modulation, the element having an optical axis and a pair of lens surfaces for focusing the laser beam to multiple focal points along the optical axis, the lens surfaces meeting along a line that intersects the optical axis and that has a length dimension extending along one of the directions, the element having a width dimension extending along the other of the directions and being independent of the length dimension; and b) an aperture stop for reducing the undesirable laser intensity modulation with concomitant reduction in the working range, the aperture stop including an optical aperture, and a support bounding the optical aperture along a border that shapes the optical aperture with variable dimensions along both of the directions along which the indicia extends, the optical aperture having a plurality of light-passing areas spaced apart along the border, and the support having a light-obstructing area between the light-passing areas along the border.

2. The assembly of claim 1, wherein the element and the aperture stop are of one-piece construction.

3. The assembly of claim 1, wherein each of the lens surfaces of the element is a plane.

4. The assembly of claim 1, wherein the element has a cylindrical incident surface for optically modifying the laser beam to have an asymmetrical cross-section.

5. The assembly of claim 1, wherein the support has a plurality of light-obstructing areas successively arranged along the border, each light-obstructing area being located between a pair of light-passing areas.

6. An optical assembly in a system for electro-optically reading indicia extending along mutually orthogonal directions by imaging laser light scattered from the indicia over a field of view, comprising:

a) an asymmetric optical element for extending depth of focus in which the indicia is read with concomitant undesirable laser intensity modulation, the element having an optical axis and a pair of lens surfaces for imaging the laser light from multiple image points along the optical axis, the lens surfaces meeting along a line that intersects the optical axis and that has a length dimension extending along one of the directions, the element having a width dimension extending along the other of the directions and being independent of the length dimension; and b) an aperture stop for reducing the undesirable laser intensity modulation with concomitant reduction in the depth of focus, the aperture stop including an optical aperture, and a support bounding the optical aperture along a border that shapes the optical aperture with variable dimensions along both of the directions along which the indicia extends, the optical aperture having a plurality of light-passing areas spaced apart along the border, and the support having a light-obstructing area between the light-passing areas along the border.

7. The assembly of claim 6, wherein the element and the aperture stop are of one-piece construction.

8. The assembly of claim 6, wherein each of the lens surfaces of the element is a plane.

9. The assembly of claim 6, wherein the support has a plurality of light-obstructing areas successively arranged along the border, each light-obstructing area being located between a pair of light-passing areas.

\* \* \* \* \*